(12) United States Patent
Beheshti et al.

(10) Patent No.: US 10,770,898 B2
(45) Date of Patent: Sep. 8, 2020

(54) METHODS AND SYSTEMS FOR ENERGY USE NORMALIZATION AND FORECASTING

(71) Applicant: Screaming Power Inc., Picton (CA)

(72) Inventors: Soosan Beheshti, Thornhill (CA); Assadallah Sahebalam, Picton (CA); Edward W. Nidoy, Mississauga (CA); Francis Palma, Picton (CA)

(73) Assignee: Screaming Power Inc., Picton (CA)

( * ) Notice: Subject to any disclaimer, the term of this patent is extended or adjusted under 35 U.S.C. 154(b) by 211 days.

(21) Appl. No.: 15/444,456

(22) Filed: Feb. 28, 2017

(65) Prior Publication Data
US 2018/0248370 A1 Aug. 30, 2018

(51) Int. Cl.
*H02J 3/00* (2006.01)
*G05B 13/04* (2006.01)
*G06Q 50/06* (2012.01)
*G05B 15/02* (2006.01)
*G06Q 10/06* (2012.01)

(52) U.S. Cl.
CPC ............ *H02J 3/003* (2020.01); *G05B 13/041* (2013.01); *G05B 15/02* (2013.01); *G06Q 10/06* (2013.01); *G06Q 50/06* (2013.01); *G05B 2219/2642* (2013.01); *H02J 2203/20* (2020.01); *H02J 2310/14* (2020.01); *Y02P 90/82* (2015.11)

(58) Field of Classification Search
CPC ........ H02J 3/00; H02J 2003/007; H02J 3/003; H02J 3/14; H02J 2203/20; H02J 2310/14; G05B 15/02; G05B 2219/2642; G05B 13/041; G06Q 10/06; G06Q 50/06; Y02P 90/82
See application file for complete search history.

(56) References Cited

U.S. PATENT DOCUMENTS

| | | |
|---|---|---|
| 7,243,044 B2 * | 7/2007 | McCalla ............... G06Q 10/00 702/182 |
| 7,519,485 B2 | 4/2009 | MacGregor |
| 7,881,889 B2 | 2/2011 | Barclay |
| 8,359,215 B1 | 1/2013 | Robbins |
| 8,370,283 B2 | 2/2013 | Pitcher |
| 8,457,802 B1 | 6/2013 | Steven |
| 8,543,343 B2 | 9/2013 | Jones |
| 8,589,112 B2 | 11/2013 | Tsypin |
| 8,660,813 B2 | 2/2014 | Curtis |
| 8,671,037 B2 | 3/2014 | Hart, Jr. |
| 8,738,334 B2 * | 5/2014 | Jiang ..................... G06Q 10/04 703/2 |
| 8,977,405 B2 | 3/2015 | Shiel |
| 9,135,667 B2 | 9/2015 | Drees |

(Continued)

OTHER PUBLICATIONS

Ujjwalkarn "A Quick Introduction to Neural Networks" The Data Science Blog (2016) available at <https://ujjwalkarn.me/2016/08/09/quick-intro-neural-networks/> (Year: 2016).*

(Continued)

*Primary Examiner* — Jay Hann
(74) *Attorney, Agent, or Firm* — Stratford Managers Corporation

(57) ABSTRACT

Disclosed herein are methods and systems for normalizing an energy use intensity value to compensate for variations in energy usage due to environment. Also disclosed are methods and systems for forecasting energy use intensity values.

14 Claims, 17 Drawing Sheets

(56) References Cited

U.S. PATENT DOCUMENTS

| | | | |
|---|---|---|---|
| 9,196,009 B2 | 11/2015 | Drees | |
| 9,286,582 B2 | 3/2016 | Drees | |
| 9,569,804 B2* | 2/2017 | Stein | G06Q 50/06 |
| 10,332,021 B1* | 6/2019 | Hoff | G05D 23/00 |
| 10,460,404 B2* | 10/2019 | Sankar | G06Q 50/06 |
| 10,527,306 B2* | 1/2020 | Boettcher | H02J 3/14 |
| 2016/0018835 A1* | 1/2016 | Gaasch | G05F 1/66 |
| | | | 700/291 |
| 2016/0266594 A1* | 9/2016 | Kauffman | G06Q 50/06 |
| 2016/0291067 A1 | 10/2016 | Al-Mohssen | |
| 2017/0300599 A1* | 10/2017 | Becerik-Gerber | |
| | | | G06F 17/5009 |
| 2018/0068034 A1* | 3/2018 | Zeifman | G06F 17/5004 |
| 2018/0240137 A1* | 8/2018 | Radich | G06F 17/18 |

OTHER PUBLICATIONS

Wong, S.L., et al. "Artificial Neural Networks for Energy Analysis of Office Buildings with Daylighting" Applied Energy, vol. 87, pp. 551-557 (2010) (Year: 2010).*

Chung, W. "Review of Building Energy-Use Performance Benchmarking Methodologies" Applied Energy, vol. 88, pp. 1470-1479 (2011) (Year: 2011).*

Chung, W., et al. "Benchmarking the Energy Efficiency of Commercial Buildings" Applied Energy, vol. 83, pp. 1-14 (2006) (Year: 2006).*

Thomsen, K. E. et al.; "Implementing the Energy Performance of Buildings Directive Brussels"; Concerted Actions; http://www.epbd-ca.eu; 2011 (594 pages).

Kissock, J. et al.; "Development of a Toolkit for Calculating Linear, Change-point Linear and Multiple-Linear Inverse Building Energy Analysis Models"; ASHRAE Research Project 1050-RP; Univ. Dayton Dept. Mech. and Aerospace Eng. and Energy Systems Laboratory; Nov. 1, 2002 (178 pages).

Fels, M.F.; "PRISM: An Introduction"; Energy and Buildings, vol. 9, No. 1, pp. 5-18; 1986 (14 pages).

Energy Star; "Energy Star Performance Rating Technical Methodology"; http://www.energystar.gov/index.cfm?c=evaluateperformance.busportfoliomanager; Nov. 2001, Updated Nov. 2011 (11 pages).

Chung, W. et al.; "Benchmarking the Energy Efficiency of Commercial Buildings"; Applied Energy, vol. 83, No. 1, pp. 1-14; 2006 (14 pages).

Lammers, N. et al.; "Measuring Progress with Normalized Energy Intensity"; SAE Int'l. J. Materials and Mfg.; vol. 4, No. 1, pp. 460-467; 2011 (8 pages).

Bonneville Power Administration (BPA); "BPAs Regression for MV: Reference Guide"; Version 1.0; Bonneville Power Administration; Sep. 2011 (56 pages).

Hydro One; "Weather Normalization for Total Utility Load"; http://www.ontarioenergyboard.ca/documents/cases/EB-2005-0317/phase3/jun15/handoutweathernormalizationhoni.pdf; Jun. 12, 2006; retrieved Feb. 12, 2013 (3 pages).

Markus, T.; "Development of a Cold Climate Severity Index"; Energy and Buildings, vol. 4, No. 4, pp. 277-283; 1982 (7 pages).

Hogeling, J. et al.; "More information on the set of CEN standards for the EPBD"; http://www.buildup.eu/publications/1484; Oct. 3, 2008 (8 pages).

Makhmalbaf, A. et al.; "Simulation-Based Weather Normalization Approach to Study the Impact of Weather on Energy Use of Buildings in the U.S."; Proc. 13th Conf. of Int'l. Building Performance Simulation Assn., Chambry, France; pp. 1436-1444; 2013 (9 pages).

http://www.energylens.com; retrieved May 30, 2017 (3 pages).

Beheshti, S. et al.; "Structure Dependent Weather Normalization"; Oct. 24, 2016 (26 pages).

\* cited by examiner

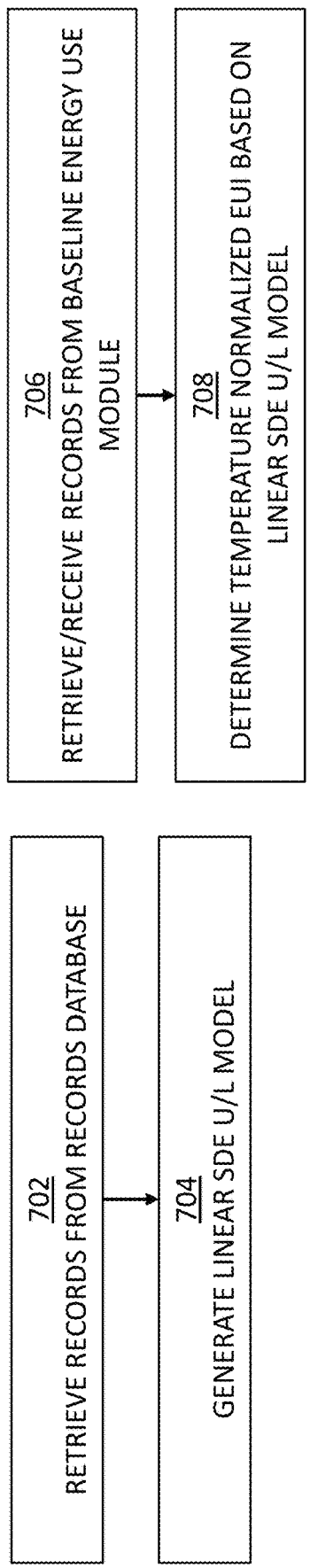
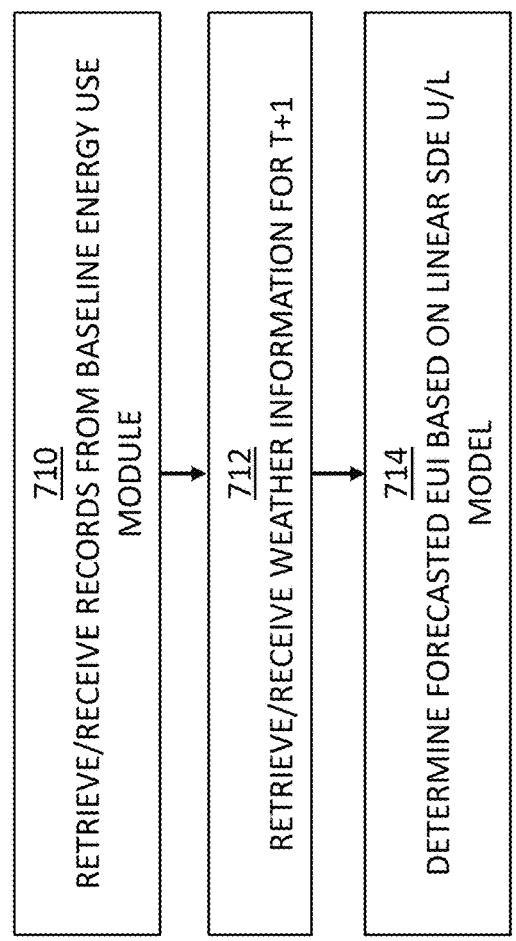
FIG. 7a
FIG. 7b
FIG. 7c

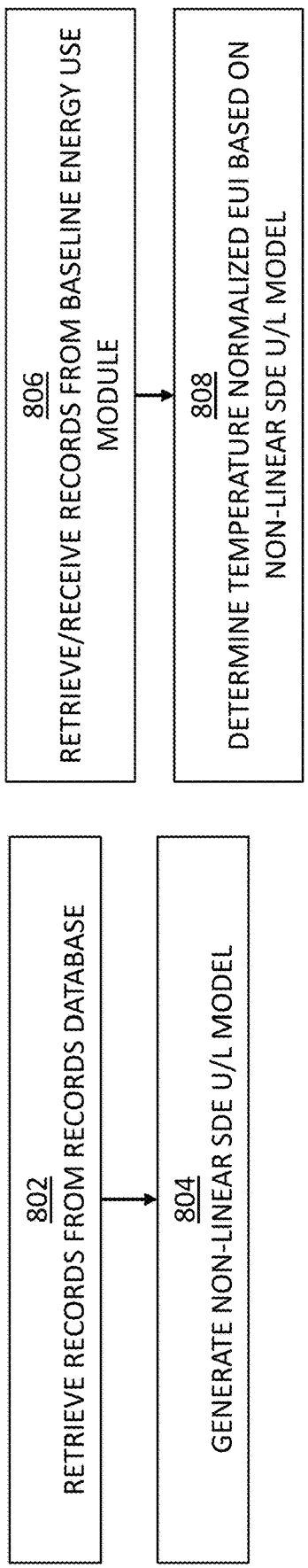
FIG. 8a
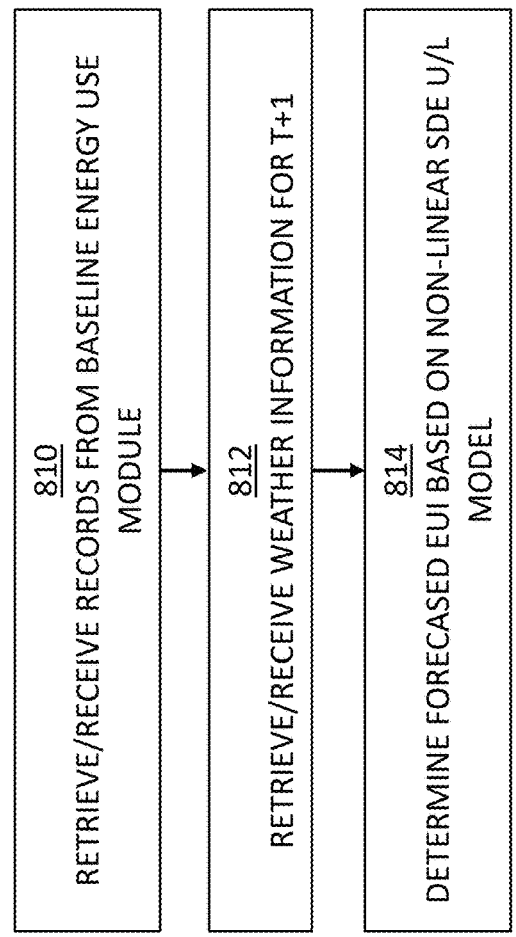
FIG. 8b
FIG. 8c

| Data | Source |
|---|---|
| Energy Consumption Reading Meter | Utility Consumption Database (UCD) of Ontario Ministry of Education, Canada |
| Air Temperature | https://www.wunderground.com |
| Humidity | https://www.wunderground.com |
| Wind speed | https://www.wunderground.com |
| Sun radiation | NASA/POWER SRB/FLASHflux/MERRA |

FIG. 13a

| Variable | DF | Parameter Estimate | tValue | Pr > |t| | Standardized Estimate | Tolerance | Variance Inflation |
|---|---|---|---|---|---|---|---|
| Intercept | 1 | 117130 | 2.57 | 0.0153 | 0 | . | 0 |
| Temp | 1 | -4746.030 | -15.56 | <0.0001 | -0.98496 | 0.347 | 2.87 |
| Wind | 1 | -1911.37 | -1.73 | 0.0934 | -0.076 | 0.710 | 1.40 |
| Humidity | 1 | 241.74 | 0.52 | 0.6084 | -0.0297 | 0.421 | 2.37 |
| Radiation | 1 | -371.15 | -0.17 | 0.86 | -0.0128 | 0.238 | 4.19 |

FIG. 13b

METHODS AND SYSTEMS FOR ENERGY USE NORMALIZATION AND FORECASTING

FIELD OF THE INVENTION

The present disclosure relates to the development of computational models of energy usage and the application of these models to forecast and normalize energy usage.

BRIEF SUMMARY

In one aspect, the present invention provides a computer-implemented method of generating a temperature-normalized energy use intensity value. The method comprises receiving, at a server, an energy use intensity value representing energy use by a structure over a time period and weather information for the structure corresponding to the time period. The method further comprises determining a baseload value based on the energy use intensity value and the weather information. The method further comprises applying a statistical model to the weather information to generate a temperature-normalized energy use intensity value.

In some embodiments, the method further comprises receiving, at the server, building occupancy information for the structure and applying the statistical model to the weather information and the building occupancy information to generate the first value.

In some embodiments, the weather information comprises one or more solar radiation values, one or more outside temperature values, one or more humidity values and one or more wind speed values.

In some embodiments, the baseload value is a passive baseload value. In some embodiments, the baseload value is the sum of an active baseload value and a passive baseload value.

In some embodiments, determining the baseload value comprises determining a heating load, a cooling load, an active baseload and a passive baseload based on the energy use intensity value and the weather information.

In some embodiments, the statistical model is a non-linear model. In some embodiments, the statistical model is a neural network. In some embodiments, the statistical model is a linear model. In some embodiments, the statistical model is generated using a type of least squares regression. In some embodiments, the statistical model comprises one or more coefficients that represent properties of the structure.

In some embodiments, the coefficients that represent properties of the structure comprise one or more of: a coefficient that represents the mass and insulation of the structure; a coefficient that represents the size, orientation and composition of the windows in the structure; and a coefficient that represents structural features or defects that allow heat to escape from the structure.

In some embodiments, the method further comprises using the temperature normalized energy use intensity value to determine one of the group consisting of: 1) a volume of greenhouse gas emissions and 2) a cost of energy use.

In another aspect, the present invention provides a computer-implemented method of generating a forecasted energy use intensity value. The method comprises receiving, at a server, an energy use intensity value representing energy use by a structure over a time period and weather information for the structure corresponding to the time period. The method further comprises determining a baseload value based on the energy use intensity value and the weather information. The method further comprises identifying weather information corresponding to a future time period. The method further comprises applying a statistical model to the energy use intensity value, the baseload value and the weather information corresponding to a future time period to generate a first value. The method further comprises adding the first value to the baseload value to generate a forecasted energy use intensity value.

In some embodiments, the method further comprises receiving, at the server, building occupancy information for the structure and applying the statistical model to the weather information and the building occupancy information to generate the first value.

In some embodiments, the method further comprises using the temperature normalized energy use intensity value to determine one of the group consisting of: 1) a volume of greenhouse gas emissions and 2) a cost of energy use.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 7a depicts steps performed by the energy modelling server 110 according to an embodiment of the invention.

FIG. 7b depicts steps performed by the energy modelling server 110 according to an embodiment of the invention.

FIG. 7c depicts steps performed by the energy modelling server 110 according to an embodiment of the invention.

FIG. 8a depicts steps performed by the energy modelling server 110 according to an embodiment of the invention.

FIG. 8b depicts steps performed by the energy modelling server 110 according to an embodiment of the invention.

FIG. 8c depicts steps performed by the energy modelling server 110 according to an embodiment of the invention.

FIG. 13a comprises a table that includes various sources of test data.

FIG. 13b comprises a table that includes various parameters learned by generating a linear SDE U/L model using test data.

Figure 1:
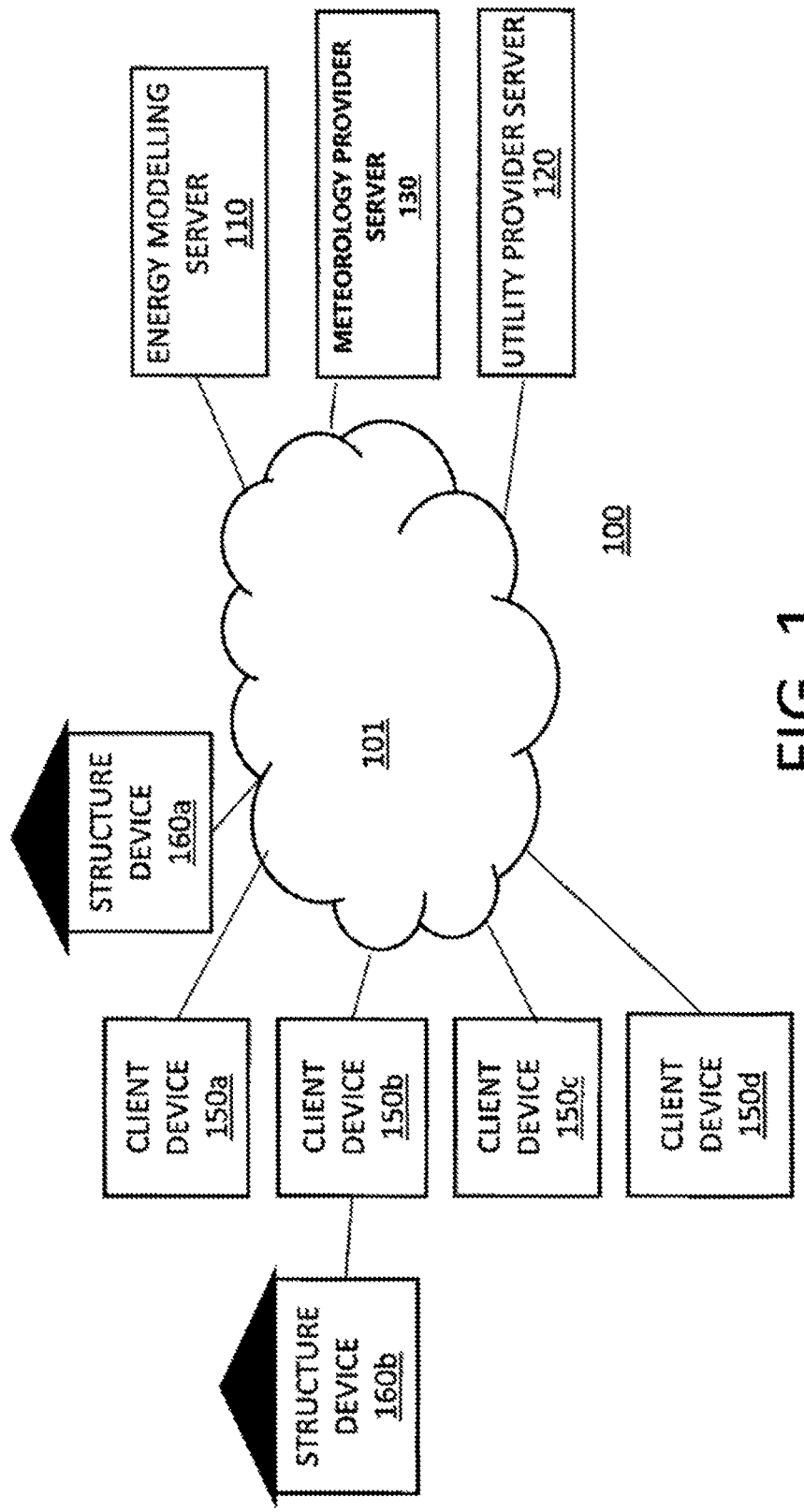
FIG. 1 depicts a network 100 according to one embodiment of the invention.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

BACKGROUND

In order to objectively evaluate energy usage, there needs to be an accurate method of normalizing the energy usage to compensate for different environmental effects. For example, it would be beneficial to be able to compare relative energy usage between two buildings in different climates, or from the same building over a time period with different or erratic weather patterns (e.g., varying weather patterns due to climate change). Current methods of normalization such as the "Degree Day" model, Climate Severity Index, the Modified Utilization Factor, and Simulation-Based Weather Normalization all have various benefits and drawbacks. Similarly, methods of normalization that are specific to a given structure such as balance points require complex information that is often difficult to obtain and/or inaccurate. Thus, there exists a need to form accurate methods of normalization. In addition, with the growing use of energy grids (e.g., smart grids) for energy allocation, there is an increased need to forecast energy consumption in order to ensure proper allocation of resources.

DETAILED DESCRIPTION

FIG. 1 depicts an example of a network 100 with various entities within the network 100 communicatively coupled via a communication medium 101 such as the internet or a telephony network with data capabilities. In FIG. 1, a single energy modelling server 110 comprising a processor and a non-transitory memory is shown communicating with several client devices 150a, 150b, 150c, 150d to transmit and receive energy usage information. In some instances, the client devices 150 may also transmit energy price information. Client devices 150 may be any type of computing device (e.g., a phone, tablet or computer) comprising a processor and a non-transitory memory. For purposes of simplicity, only four client devices 150 are shown. In various instances, there may be thousands or millions of client devices 150. Similarly, in other embodiments, the functions performed by the energy modelling server 110 may be performed by several energy modelling servers 110 and/or a cloud computing platform.

The energy modelling server 110 is also shown communicating with a utility provider server 120 to transmit and receive real energy usage information. In various implementations, there may be several utility provider servers 120. In addition, the utility provider server 120 may transmit energy price information to the energy modelling server 110. In addition, the energy modelling server 110 is shown communicating with a meteorology provider 130 to receive detailed weather information such as temperature, wind speed, humidity and solar radiation.

As shown in FIG. 1, the client devices 150 and/or energy modelling server 110 communicate with other associated structure-based devices 160 that provide information about energy usage in a residential or commercial structure. Depending on the embodiments, the client device 150 and/or energy modelling server 110 may communicate with a structure-based device 160 such as a programmable thermostat (e.g. GOOGLE NEST™), to receive detailed energy usage information, such as thermostat readings and/or other energy usage (e.g., usage of lights and appliances).

Figure 2:
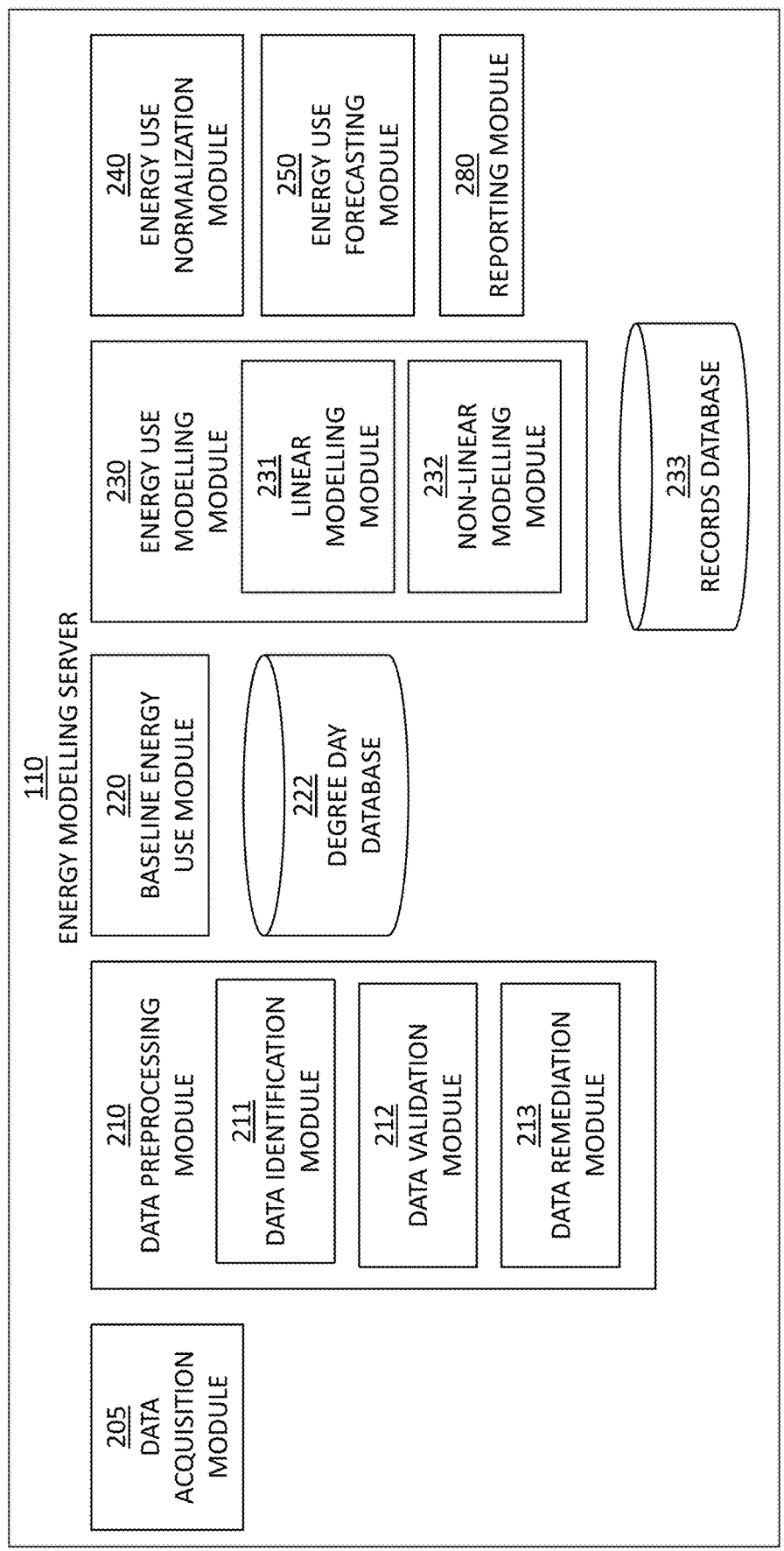
FIG. 2 depicts an energy modelling server 110 according to one embodiment of the invention.

FIG. 2 depicts an energy modelling server 110 according to one embodiment of the present invention. Those skilled in the art can appreciate that functionality performed by each module may be performed by other modules. Similarly, those skilled in the art can appreciate that the various data elements, databases and modules depicted in FIG. 2 can be organized in different ways or may be external to the energy modelling server 110.

The energy modelling server 110 comprises: a data acquisition module 205, a data pre-processing module 210, a baseline energy use module 220, an energy use modelling module 230, an energy-use normalization module 240, an energy use forecasting module 250 and a reporting module 280. The data pre-processing module 210 comprises a data identification module 211, a data validation module 212 and a data remediation module 213. The baseline energy use module 220 is communicatively coupled with a degree day database 222. The energy use modelling module 230 comprises a linear modelling module 231 and a non-linear modelling module 232. The energy use modelling module 230 is communicatively coupled with a records database 233 of energy usage information (e.g., historical energy use information). All of the modules within the energy modelling server 110 are communicatively coupled with each other and/or external entities.

The data acquisition module 205 communicates with external entities to obtain weather information and raw energy use data. In some embodiments, the data acquisition module 205 communicates with client devices 105 to obtain data relating to the energy use at one or more structures (referred to herein as "raw energy use data"). Raw energy use data may include, but is not limited to: electrical energy use data, gas energy use data, solar energy use data, and/or water use data. As discussed above, in alternate embodiments, the data acquisition module 205 may also obtain raw energy use data from structure-based devices 160 and/or the utility provider server 120. In some instances, the geographic coordinates of a structure are retrieved along with the raw energy use data for the structure. In some embodiments, the raw energy use data is provided manually using an interface on a client device 150.

In some embodiments, the data acquisition module 205 communicates with external weather databases (not shown) to obtain weather information for specific geographic locations. Weather information can include but is not limited to the recorded temperature (T), wind speed (W), humidity (H), and solar radiation (S) information. Exemplary databases that provide accurate weather information include but are not limited to: Open Weather Map, IBM, World Weather Online, AccuWeather, Forecast.io, AerisWeather, National Oceanic and Atmospheric Administration (NOAA), WeatherBug, Weather Underground, and Yahoo Weather.

The data pre-processing module 210 functions to process the retrieved raw energy-use data and weather information for further data processing and analysis. The data identification module 211 identifies the format and type of incoming data. In some instances, the data identification module 311 reformats the incoming data or coverts the incoming data to a specific unit of measurement. For example, in some embodiments, all raw energy use data is converted to kilowatt hours.

The data validation module 212 performs a series of functions to determine whether there are potential errors in the incoming data. For example, the data validation module 212 identifies missing data, null data, differences in row counts and data mismatches. In a specific embodiment, the data validation module 212 uses a machine learning algorithm in conjunction with a z-score threshold value to identify anomalous data values.

The data remediation module 213 attempts to remediate or re-calculate data that that is indicative of an error. For example: missing or erroneous values may be replaced using data that is interpolated from existing value, an average of existing data or a mean of existing data. In a specific embodiment, the data remediation module 213 uses a predictive model to replace data that is indicative of error.

The baseline energy use module 220 functions to determine different types of energy "loads" associated with each structure. The term "load" as used herein refers to a quantum of energy that serves a specific purpose. Consequently, the terms "heating load" and "cooling load" as used herein respectively refer to quanta of energy required to heat and cool a building to compensate for weather conditions in order to maintain a comfortable building temperature. Conversely, the term "baseload" as used herein refers to quanta of energy used by the building that does not depend on the weather. An "active baseload" is a quantum of energy used by the building that varies over time (e.g. charging a car, operating a hot tub). A "passive baseload" is a quantum of energy used by the building that is fixed over time (e.g. lighting fixture energy use). The baseline energy use module 220 calculates the heating load, cooling load, active base load, and passive base load based, in part on energy use intensity ("EUI") value. The EUI value is a value used to represent a structure's energy use in a specific time period. In specific embodiments described herein, the EUI value is the sum of the electrical energy use and gas energy use in a specified time period.

The baseline energy use module 220 uses information in the degree day database 222 to determine the various loads of energy discussed above by correlating energy use to heating degree days (HDDs) and cooling degree days (CDDs). Specific steps performed by the baseline energy consumption module 220 are discussed below with respect to FIGS. 5 and 6.

The energy use modelling module 230 functions to generate statistical models of energy use based on information stored in the records database 233. This records database 233 stores a set of energy usage records for a series of structures. In most embodiments, each energy usage record comprises a time period, an EUI value for a structure at the time value, baseload energy use (e.g., passive baseload and, optionally, active baseload), weather information for the structure at the time period. In some embodiments, each energy use record further comprises occupant-dependent energy use information such as the number of occupants of the structure, the number of hours per day the structure is occupied by the occupants, and/or the difference between a standard set point and the occupant selected set point temperature. The energy use records in the records database 233 may be received from the data acquisition module 205 and transformed using the data pre-processing module 210. In various embodiments and instances, some of this information may be incomplete for each record or extrapolated from similar structures or similar climates.

The linear modelling module 231 applies linear modelling algorithms to the information in the records database 233 to construct a linear Structure Dependent Energy Usage/Loss (SDE U/L) model based on weather information and other parameters. Depending on the embodiment, various types of linear multivariate statistical modelling algorithms may be used including but not limited to various sub-types of: least-squares regression, stepwise regression, best subsets regression, principal component regression, and fitted line plot.

In a specific embodiment, the linear modelling module 231 receives records data including the following parameters: EUI, a baseload value ($EUI^{Baseload}$), recorded temperature (T), wind speed (W), humidity (H), and solar radiation (R). Depending on the embodiment, the baseload value ($EUI^{Baseload}$) can either be 1) the passive baseload value or 2) the sum of the active baseload and the passive baseload. In some embodiments, the records data will receive a building occupancy parameter (P) that is based on the occupancy-dependent energy use information discussed above. In a specific embodiment, the linear modeling algorithm (and non-linear modeling algorithm, as discussed below) attempts to determine the impact of the above-discussed parameters using the EUI value and $EUI^{Baseload}$ as shown below:

$$EUI=EUI^{Baseload}+gbl(T,W,R,H,P) \quad \text{Equation 1:}$$

In some embodiments, the linear modelling module 231 learns a SDE U/L model including the coefficients for the parameters included in the equation below:

$$gbl(T,W,R,H,P)=\alpha+aT+bR+cW+dH+eP \quad \text{Equation 2:}$$

In this embodiment, $\alpha$ is a fixed coefficient and some learned coefficients represent properties of a structure that affect the structure's energy usage. Specifically, the coefficient "a" represents the structure's mass and insulation; the coefficient "b" represents the size, orientation and composition (e.g., glass or blinds composition) of the windows in the structure; the coefficient "c" represents structural features or defects that allow heat to escape from the structure (e.g., gaps and cracks around windows, construction joints, flues, ventilators). In addition, the coefficient "e" represents the energy-use behavior of the building's occupants.

The non-linear modelling module 232 applies non-linear modeling techniques to the information in the records database 233 to construct a non-linear SDE U/L model based on weather information and other parameters. Depending on the embodiment, the non-linear modelling module 232 may use any type of multivariate non-linear statistical modelling algorithm including but not limited to: non-linear regression, non-linear least squares regression, Gauss-Newton, gradient descent, Levenberg-Marquardt models and neural networks. In neural network models, each of the parameters T, H, W, R and P described above may be assigned to a node at the lowest layer of the network. In addition, the non-linear modelling module 232 may use various techniques such as gradient descent back propagation (with and without momentum), variable learning rate back propagation (with and without momentum), conjugate gradient back propagation, and quasi-Newton back propagation.

Figure 9:
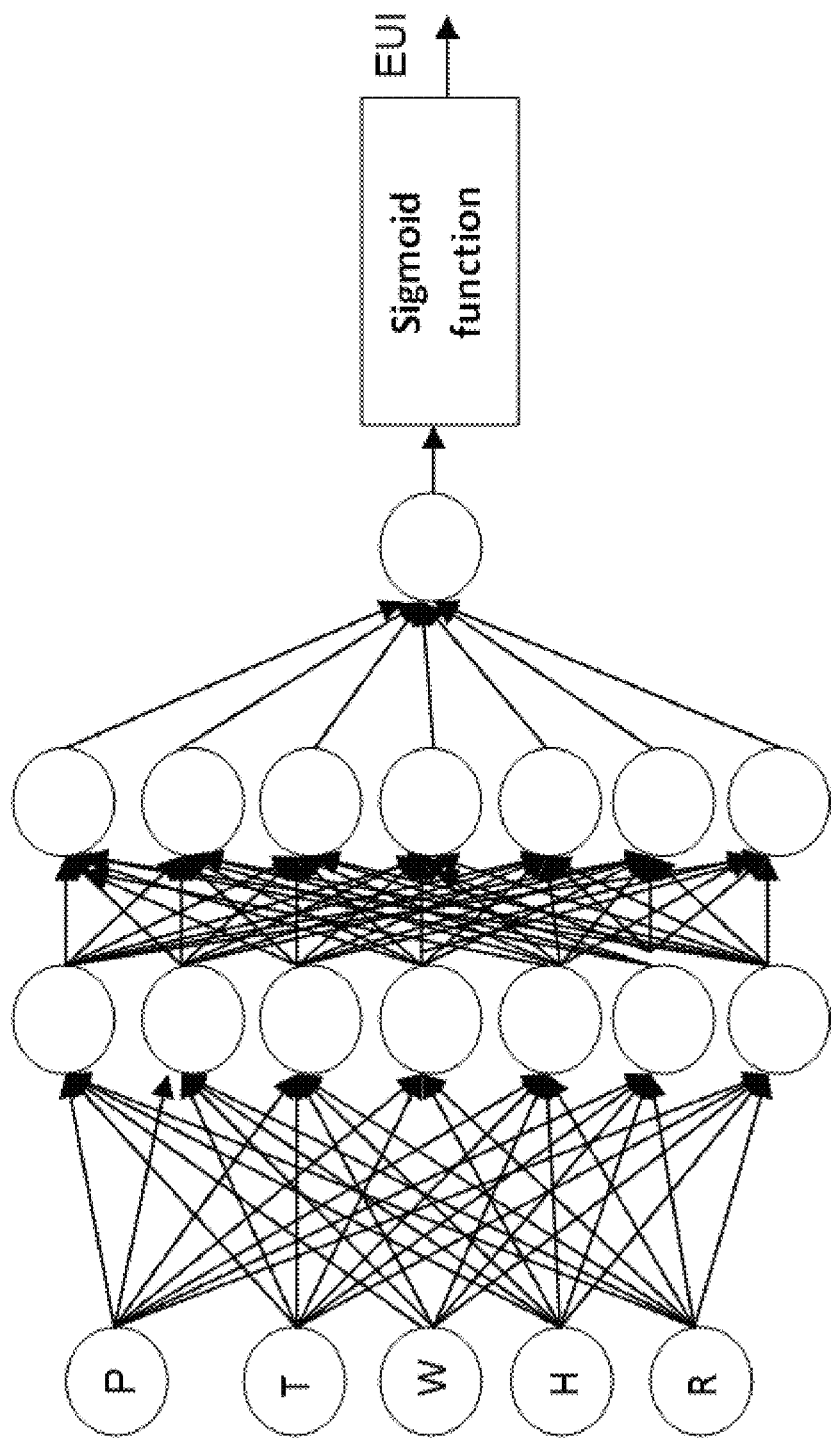
FIG. 9 depicts an exemplary neural network topology for generating a non-linear SDE U/L model.
Figure 10:
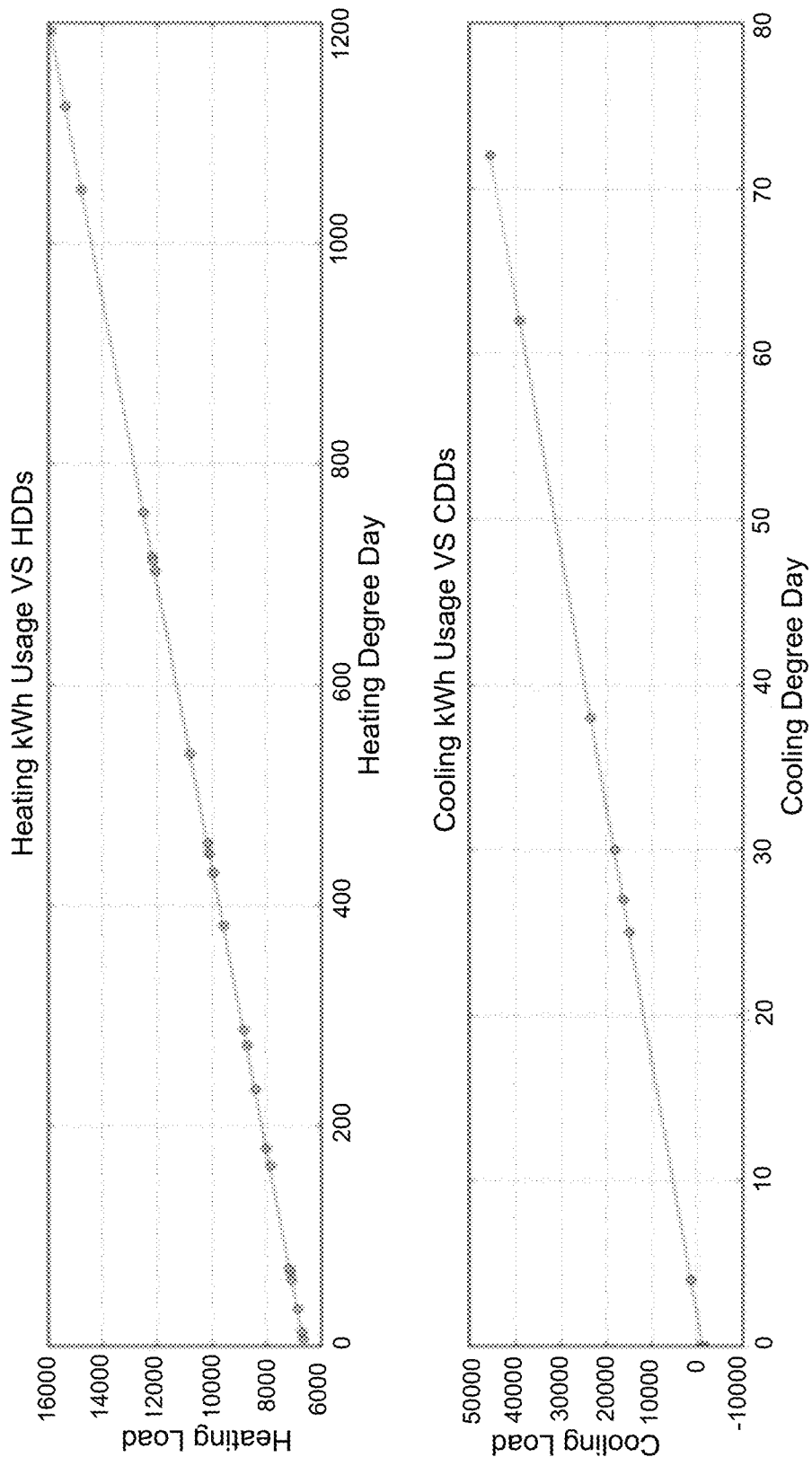
FIG. 10 are plots of exemplary heating and cooling loads (expressed in kilowatt hours) over heating and cooling degree days.

In some embodiments, a neural network is used as a non-linear model and T, W, R, H and P data is learned by input nodes in a multi-layer neural network. In a specific embodiment, there is an input node that corresponds to each of the parameters T, W, R, H and P. In some embodiments, back-propagation is used to compare the output of the multi-layer neural network with an expected output and use comparison data to modulate the input and outputs of certain nodes. In a specific embodiment (discussed below with respect to Example 1), a multi-layer perceptron feed forward neural network with two hidden layers and five input nodes is used in conjunction with options for resilient gradient descent and back propagation is used to generate a non-linear SDE U/L model. The topology for this neural network is shown in FIG. 9.

The energy use normalization module 240 applies the SDE U/L models learned by the energy modelling module 230 to EUI and $EUI^{Baseload}$ values to obtain a temperature normalized EUI value ($EUI^{T-Normalized}$). Depending on the SDE U/L model used (e.g., linear or non-linear), energy use normalization module 240 may use different methods of normalization. In a specific embodiment where the linear SDE U/L model shown in Equation 2 is used, the temperature is set to a "set point" temperature and equation below is used to determine the temperature normalized EUI value ($EUI^{T-Normalized}$).

$$EUI^{T-Normalized} = EUI^{Baseload} + g_{bl}(T=\text{set point}, W, R, H, P) \quad \text{Equation 3:}$$

As can be appreciated by those skilled in the art, similar methods of normalization may be performed with other linear SDE U/L models.

In embodiments where a non-linear SDE/L model is used, the EUI value can be temperature normalized by inputting the weather information with a temperature set point (T=set point, W, R, H) and building occupant parameter P into a non-linear model which attempts to model the influence of T, W, R, H and P on the portion of the EUI that is not attributable to the passive, and optionally, active baseload (i.e., $EUI-EUI^{Baseload}$). The value output by the non-linear model is then added to $EUI^{Baseload}$ to produce $EUI^{T-Normalized}$.

The energy use forecasting module 250 applies SDE U/L models to EUI values to determine a prospective or forecasted EUI value ($EUI^{Forecasted}$). The term "forecasted" as used herein refers to forecasted and/or predicted values. Depending on the embodiment, different methods of applying the SDE U/L model to determine forecasted energy usage may be used. In embodiments, where the SDE U/L model expressed in Equation 1 is used, the forecasted EUI ($EUI^{Forecasted}$) may be calculated using Equation 4 below:

$$EUI^{Forecasted} = EUI^{Baseload} + gbl(T=T|_{t+1}, W=W|_{t+1}, R=R|_{t+1}, H=H|_{t+1}, P=P|_{t+1}) \quad \text{Equation 4:}$$

Where $EUI^{Baseload}$ is determined for future time point T+1, and the values for parameters T, W, R, H and P are all average values for the future time point T+1. The values for the parameters may be taken from historical data or from forecasted data.

As can be appreciated by those skilled in the art, similar methods of determining a forecasted EUI ($EUI^{Forecasted}$) can be used with other linear SDE U/L models. In other embodiments where a non-linear SDE/L model is used, the forecasted EUI ($EUI^{Forecasted}$) can be calculated by inputting the weather information for T+1, and building occupancy parameter P into the non-linear model. The non-linear model uses these values to determine a value that is added to $EUI^{Baseload}$ to determine $EUI^{Forecasted}$.

The reporting module 280 communicates with the client devices 150 and the utility server 120 to transmit data produced by other modules. The reporting module 280 additionally generates various graphical user interfaces and reports of the data produced by various other models for use at the energy modelling server 110. In various embodiments, the various energy usage values such as active baseload, passive baseload, EUI, $EUI^{Forecasted}$ and $EUI^{T-Normalized}$ can be reported and/or used to calculate related values. For example, any of these values can be used to calculate unit values of greenhouse gas emissions and the associated cost (e.g. price in dollars) of energy usage which can be reported to the client devices 150. Similarly, historical data for these values can be used to calculate a peak load or demand (i.e. the greatest amount of energy a structure may use). In addition, peak load/demand as well as values for $EUI^{Forecasted}$ may be reported to a utility provider server 120 in order to provide accurate energy allocation.

As discussed below with respect to Example 1 and shown in FIGS. 14, 15, 16a and 16b, the reporting module 280 may plot and transmit to client devices 150 the $EUI^{T-Normalized}$ values for different time periods (e.g. months or years) to allow the evaluation of any changes to the building or other measures to conserve energy. Similarly, the reporting module 280 may plot and transmit to client devices 150 the $EUI^{Forecasted}$ values or associated estimated cost may to allow the client to review forecasted energy costs. As also discussed below, the reporting module 270 may plot and transmit to client devices 150, the relative and/or actual energy usage due to the active baseload, the passive baseload, the heating load and the cooling load.

Figure 3:
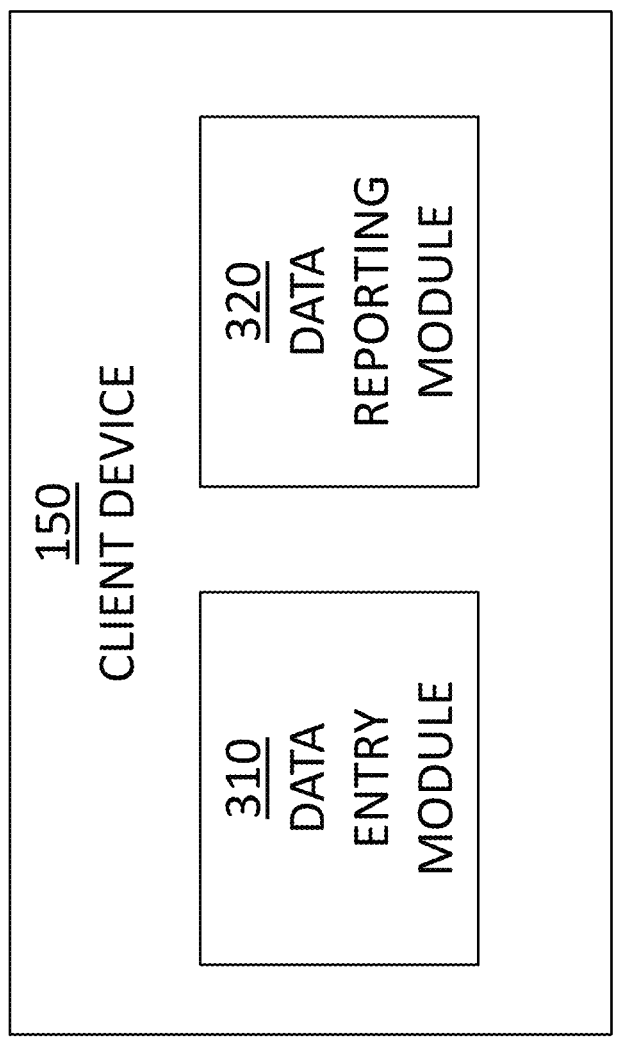
FIG. 3 depicts a client device 150 according to one embodiment of the invention.

FIG. 3 shows a high-level diagram of modules and data elements that are included on the client device 150 and used by the client device 150 to communicate with the energy modelling server 110. Those skilled in the art can appreciate that functionality performed by each module may be performed by other modules. Similarly, those skilled in the art can appreciate that the various data elements, databases and modules depicted in FIG. 2 can be organized in different ways or may be external to the client devices 150.

The data entry module 310 allows users at client devices to manually enter their energy usage data. The data entry module 310 communicates with the energy modelling server 110 to transmit manually-entered data.

The data reporting module 320 allows user to view data and plots related to various values calculated by the energy modeling server 110 (e.g., by the reporting module 280), including but not limited to: heating loads, cooling loads, active baseloads, passive baseloads, EUIs, temperature normalized EUIs and prospective EUIs. The data reporting module 320 communicates with the energy modeling server to receive data generated by the energy modeling server 110.

Figure 4:
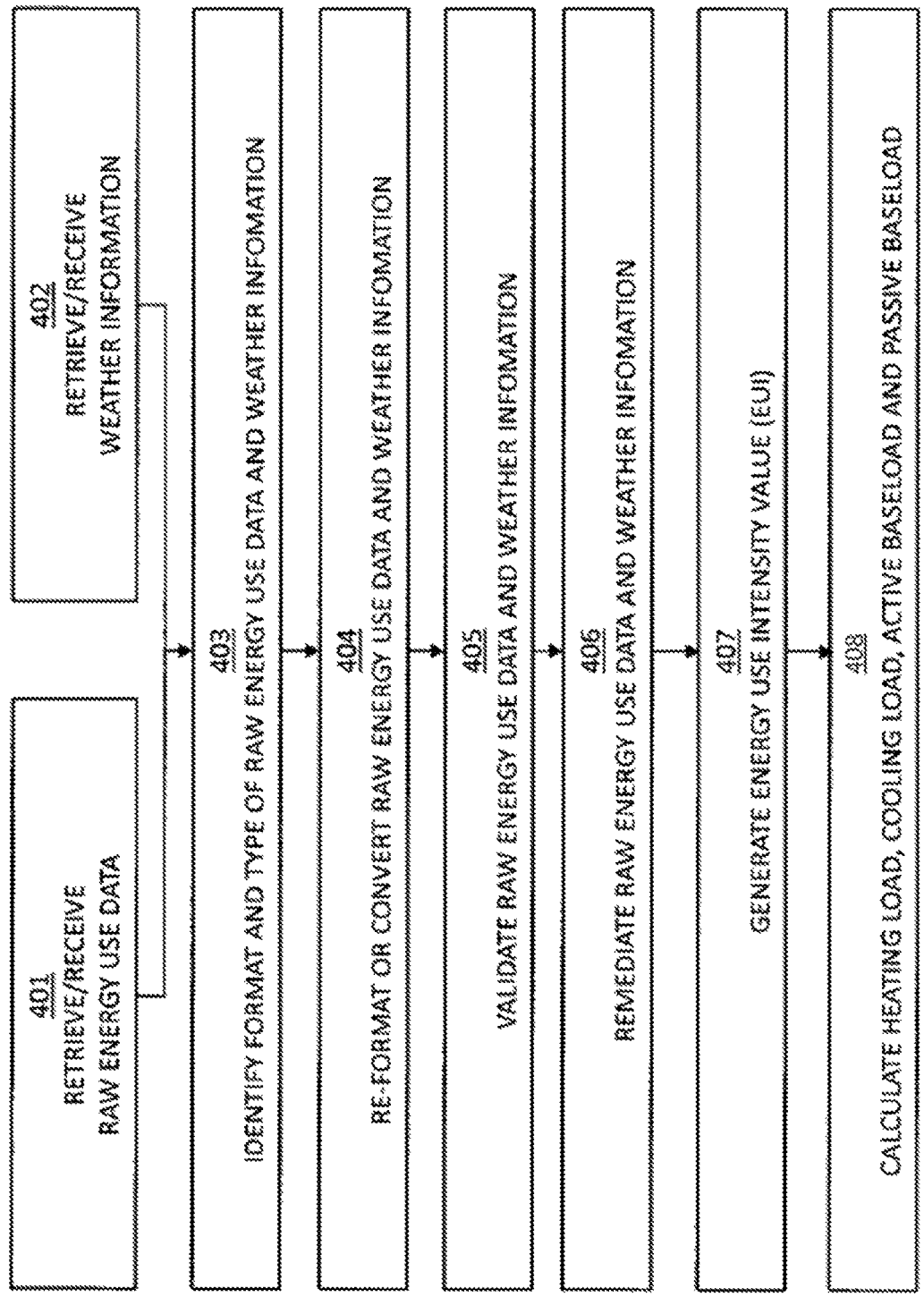
FIG. 4 depicts steps performed by the energy modelling server 110 according to one embodiment of the invention.

FIG. 4 depicts high-level steps performed by the energy modelling server 110. Those, skilled in the art can appreciate that some of these steps may be performed by entities other than the energy modelling server 110. Similarly, those skilled in the art can appreciate that some steps may not be performed, that steps may be performed on a continuous basis and/or in a different order.

At step 401, the data acquisition module 205 either receives raw energy use data from client devices 150, structure-based devices 160 and/or a utility provider server 120 or retrieves the raw energy use data from the same entities. At step 402, the data acquisition module 205 either receives weather information from external databases or retrieves the weather information from the external databases. At step 403, the data identification module 211 identifies the types of raw energy use data and weather information that were received or retrieved in steps 401 and 402. At step 404, the data identification module 211 reformats the raw energy use data and the weather information and/or converts the raw energy use data and weather information to different units of measurement.

At step 405, the data validation module 212 validates the raw energy use data and the weather information and identifies data/information for remediation. At step 406, the data remediation module remediates any raw energy use data and/or weather information that requires remediation.

At step 407, the baseline energy use module 220 determines the energy use intensity value for a time period based on the remediated raw energy use data. In a specific embodiment, the energy use intensity value is the sum of the gas energy use and electrical energy use expressed in kilowatt hours.

At step 408, the baseline energy use module 220 calculates the heating load, cooling load, active baseload and passive baseload. Detailed steps performed by the baseline energy use module 220 to calculate the heating load, cooling load, active baseload and passive baseload are discussed below with respect to FIGS. 5 and 6.

Figure 5:
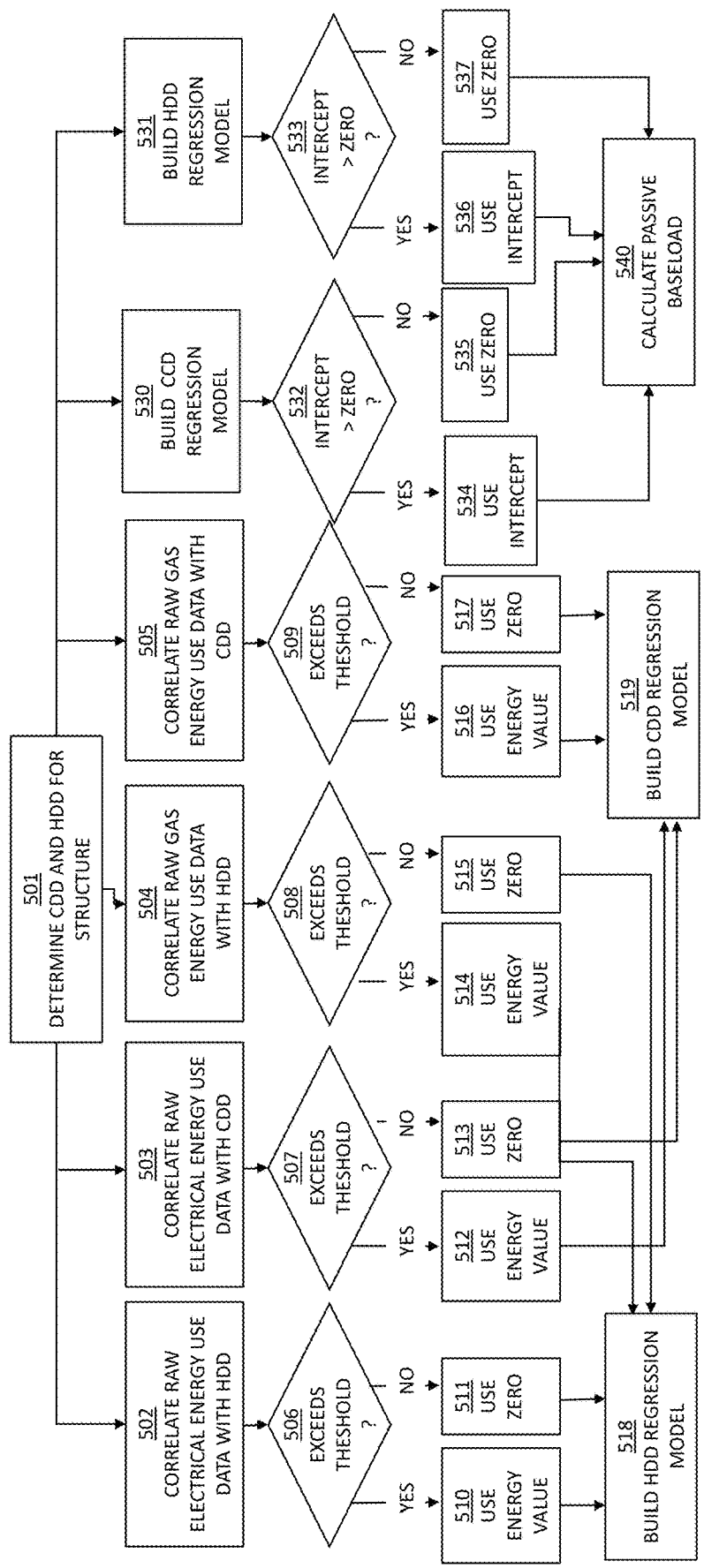
FIG. 5 depicts steps performed by baseline energy use module 220 according to one embodiment of the invention.

FIG. 5 depicts detailed steps performed by the baseline energy use module 220. Those skilled in the art can appreciate that some of these steps may be performed by entities other than the baseline energy use module 220. Similarly, those skilled in the art can appreciate that some steps may not be performed and that some steps may be performed on a continuous basis and/or in a different order.

Figures 11A, 11B:
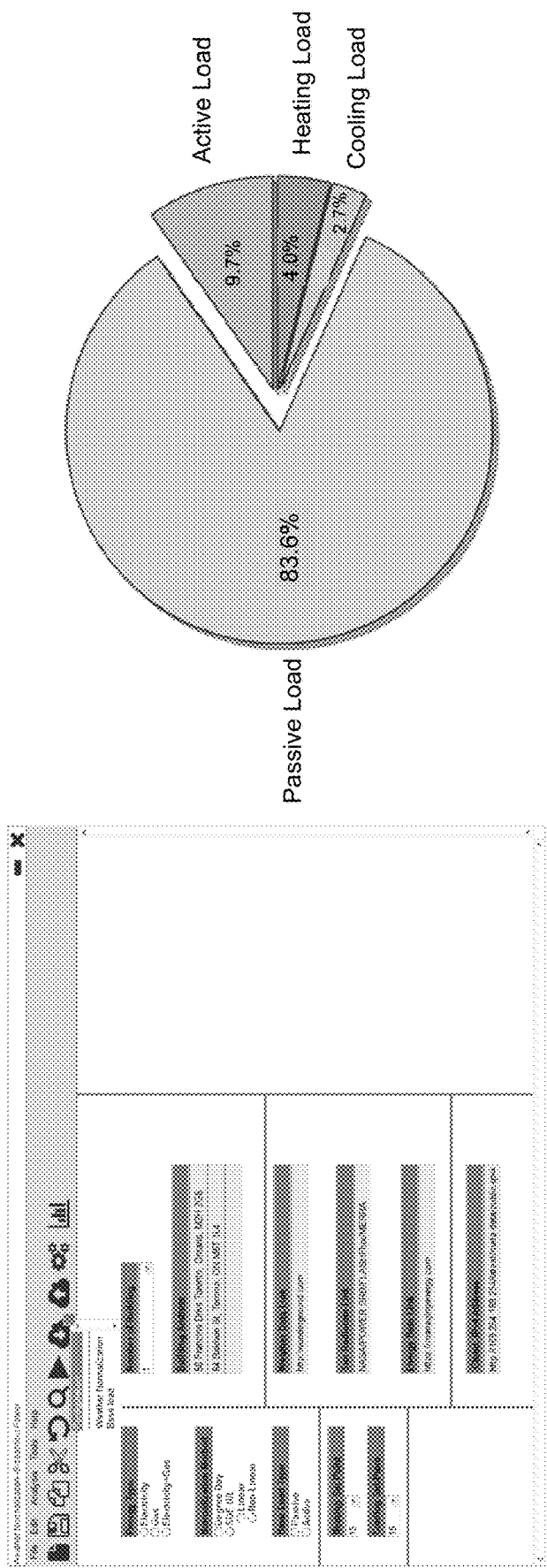
FIG. 11a depicts an exemplary graphical user interface used to generate and view information produced by the baseline energy consumption module 320 according to one embodiment of the invention.
FIG. 11b is a pie chart depicting relative percentages of energy usage due to an active baseload, a passive baseload, a heating load and a cooling load.
Figure 12:
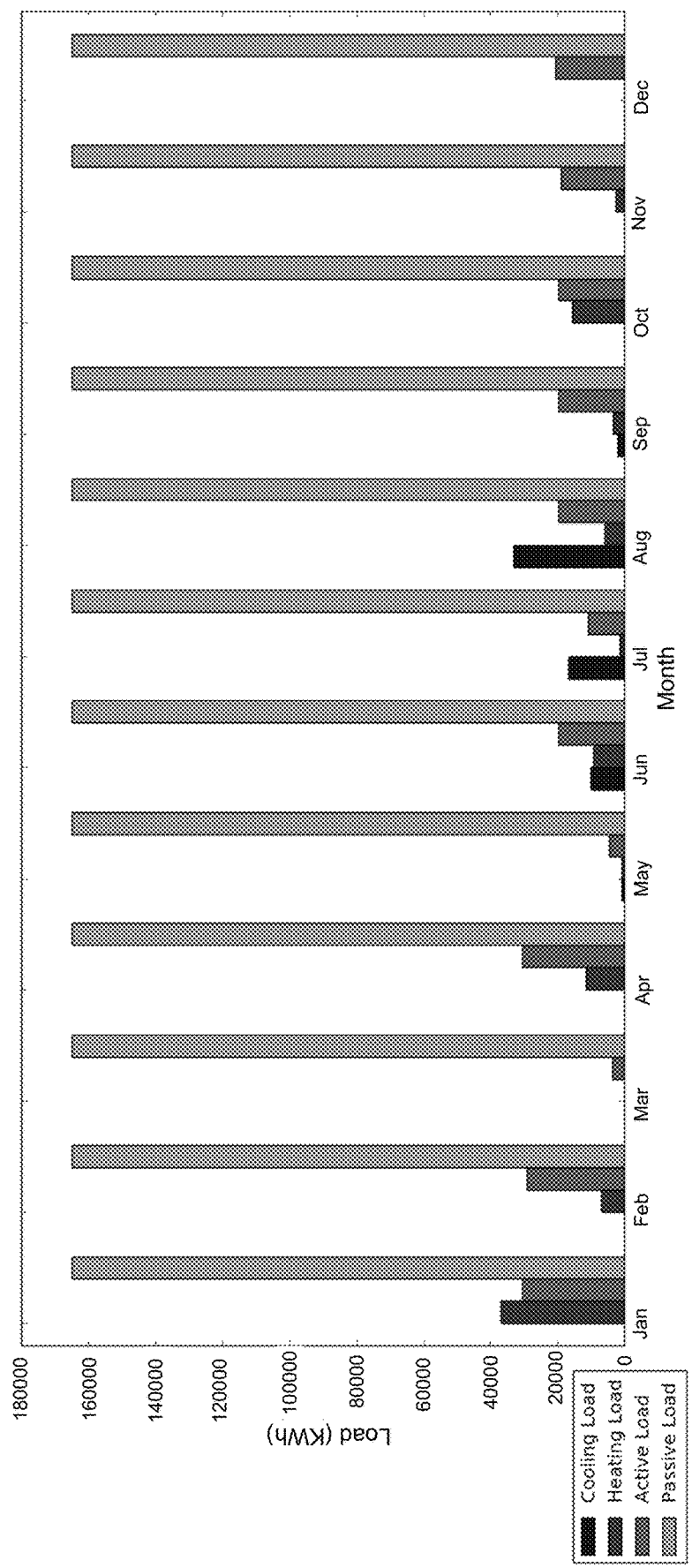
FIG. 12 is a bar graph depicting energy usage (in kilowatt hours) attributable to an active baseload, a passive baseload, a heating load and a cooling load.

At step 501, the baseline energy use module 220 either generates cooling degree day (CDD) and heating degree day (HDD) data based on the weather information received for the geographic location of the structure or retrieves CDD and HDD data from the degree day database 222. CDD is a term of art which refers to the amount and duration that an outside temperature at a given location is above a base temperature. HDD is a term of art which refers to the amount and duration that an outside temperature at a given location is below a base temperature. In a specific embodiment, as in Canada, the base temperature used to calculate CDD and HDD is 18 degrees Centigrade. FIG. 11a shows a graphic user interface that can be used to enter a base temperature used to calculate CDD and HDD (shown as heating SPT and cooling SPT).

At steps 502, 503 an electrical energy use value for a time period is correlated with the HDD and CCD values for the same time period, respectively. At steps 504 and 505, a gas energy use value for a time period is correlated with the HDD and CDD values for the same time period, respectively. At steps 506, 507, 508 and 509, each of the correlation values generated in steps 502, 503, 504 and 505 are compared to a threshold. The threshold used for each of step 506, 507, 508, 509 can be determined using various cut-off points and historical data. In some embodiments, the threshold may be zero.

If the correlation value exceeds the threshold, at steps 510 and 514 respectively, the electrical energy use value or gas energy use value is set as a value used to generate the HDD regression model at step 518. If the correlation value exceeds the threshold, at steps 512 and 516 respectively, the electrical energy use value or gas energy use value is set as a value used to generate the CDD regression model step 519. If the correlation value does not exceed the threshold, at steps 511 and 515 respectively, a zero value is used to generate the HDD regression model at step 518. If the correlation value does not exceed the threshold, at steps 513 and 517 respectively, a zero value is used to generate the CDD regression model at step 519.

At step 519, a regression model of CDD is generated using the received gas energy use value, electrical energy use value and/or zero values. In a specific embodiment, a value E is generated by subtracting the passive baseload from the sum of the received gas energy use value, electrical energy use value and/or zero values and the regression model is calculated according to the following equation:

$$E = \alpha + \beta CDD \qquad \text{Equation 5:}$$

where CDD is the heating degree days for the time period and $\beta$ is a coefficient and $\alpha$ is an intercept.

At step 518, a regression model of HDD is generated using the received gas energy use value, electrical energy use value and/or zero values. In a specific embodiment, a value E is generated by subtracting the passive baseload from the sum of the received gas energy use value, electrical energy use value and/or zero values and the regression model is calculated according to the following equation:

$$E = \alpha + \beta HDD \qquad \text{Equation 6:}$$

where CDD is the cooling degree days for the time period and $\beta$ is a coefficient and $\alpha$ is an intercept.

Steps 530-540 can be either performed by the baseline energy use module 220 concurrently with steps 502-519 or sequentially before or after steps 502-517.

At step 530, a regression model of the raw energy use (gas and electric energy use values) and CDD is generated. In a specific embodiment, the regression model will use the Equation 5 (above) with E=gas energy use value+electric energy use value. At step 531, a regression model of the raw energy use (gas and electric energy use values) and HDD is generated. In a specific embodiment, the regression model will use the Equation 6 (above) with E=gas energy use value+electric energy use value.

If the intercept of the CDD/raw energy use regression model is greater than zero, at step 534, the intercept is set as the value to use in calculating the passive baseload at step 540. If the intercept of the CDD/raw energy use regression model is not greater than zero, at step 535, then zero is set as the value to use in calculating the passive baseload at step 540.

If the intercept of the HDD/raw energy use regression model is greater than zero, at step 536, the intercept is set as the value to use in calculating the passive baseload at step 540. If the intercept of the FDD/raw energy use regression model is not greater than zero, at step 537, then zero is set as the value to use in calculating the passive baseload at step 540.

At step 540, the passive baseload is calculated based on the received values. In a specific embodiment, if both of the received values are zero, the historic minimum value is used to calculate the passive baseload. The historical minimum energy use value is the minimum energy use value of all recorded energy use values—it is thought to be a closest proxy for the passive baseload on the assumption that there should be a time period where the active base load, heating load and cooling load are minimized.

In a specific embodiment, if only one of the received values is zero, the non-zero intercept value received is used as the passive baseload. If both of the received values are non-zero intercept values, the minimum of the two intercept values is used as the passive baseload. The passive baseload is then used at steps 519 and 518 to generate the CCD and HHD regression models.

Figure 6:
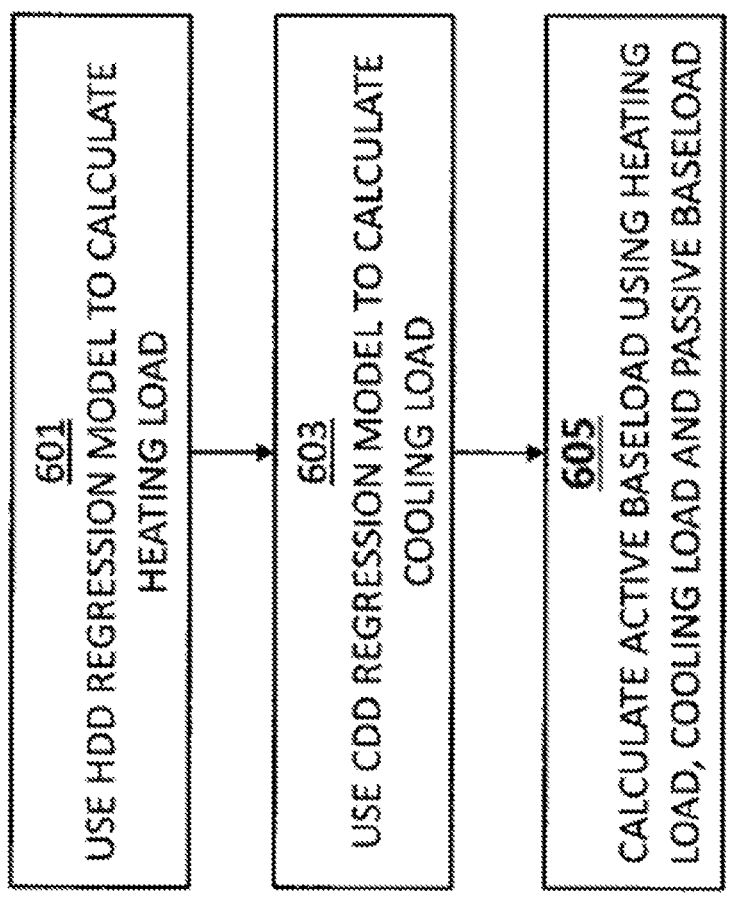
FIG. 6 depicts steps performed by baseline energy use module 220 according to one embodiment of the invention.

FIG. 6 depicts steps performed by the baseline energy use module 220. Those skilled in the art can appreciate that some of these steps may be performed by entities other than the baseline energy use module 220. Similarly, those skilled in the art can appreciate that some steps may not be performed, that steps may be performed on a continuous basis and/or in a different order.

At step 601, the baseline energy use module 220 uses the HDD regression model (discussed above with respect to FIG. 5 and generated at step 518) to calculate the heating load. In a specific embodiment, the intercept α of the HDD regression model is used as the heating load.

At step 603, the baseline energy use module 220 uses the CDD regression model (discussed above with respect to FIG. 5 and generated at step 519) to calculate the cooling load. In a specific embodiment, the intercept α of the CDD regression model is used as the cooling load.

At step 605, the baseline energy use module 220 determines the active baseload based on the passive baseload, the heating load and the cooling load. In a specific embodiment, the active baseload is determined by subtracting the passive baseload, the heating load and the cooling load from the EUI value.

FIGS. 7a, 7b and 7c depicts steps performed by the energy modelling server 110 to generate and apply linear models of energy use. Those skilled in the art can appreciate that some of these steps may be performed by entities other than the energy modelling server 110. Similarly, those skilled in the art can appreciate that some steps may not be performed, that steps may be performed on a continuous basis and/or in a different order.

FIG. 7a depicts steps performed by the linear modelling module 231 to generate a linear SDE U/L model. At step 702, the linear modelling module 231 receives as input records from the records database 233 comprising the following: an EUI value for a structure at a time period, a baseload value $EUI^{Baseload}$ for the time period, corresponding weather information (T, H, W, R) for the time period, and optionally, a building occupancy parameter (P). At step 704, the linear modelling module 231 generates a non-linear SDE U/L model. Exemplary SDE U/L models are discussed above.

FIG. 7b depicts steps performed by the energy use normalization module 240 to generate a temperature normalized EUI value ($EUI^{T\text{-}Normalized}$). At step 706, the energy use normalization module 240 receives a record from the baseline energy use module 220, the record comprising the following: an EUI value for a structure at a time period, a baseload value $EUI^{Baseload}$ for the time period, corresponding weather information (T, H, W, R) for the time period, and optionally, a building occupancy parameter (P). In other embodiments, records comprising the same information may be retrieved from storage (e.g., stored in the records database 233 or a separate database).

At step 708, the energy use normalization module 240 applies a linear SDE U/L model to a set point temperature T, weather information H, W, R and building parameter P to generate a value that is added to the baseload value ($EUI^{Baseload}$) to generate a temperature normalized EUI value ($EUI^{T\text{-}Normalized}$). Exemplary methods of applying a non-linear SDE U/L model to generate a temperature normalized EUI value are discussed above.

FIG. 7c depicts steps performed by the energy use forecasting module 250 to generate a forecasted EUI value for a future time period (T+1) ($EUI^{Forecasted}$). At step 710, the energy use forecasting module 250 receives a record from the baseline energy use module 220, the record comprising the following: an EUI value for a structure at a time period, a baseload value ($EUI^{Baseload}$) for the time period, and optionally, a building occupancy parameter (P). In other embodiments, records comprising the same information may be retrieved from storage (e.g., stored in the records database 233 or a separate database).

At step 712, the energy use forecasting module 250 retrieves or receives weather information for a prospective time period (T+1). As discussed above, the energy use forecasting module 250 can use either historical or forecasted weather information for the prospective time period.

At step 714, the energy use forecasting module 250 applies a linear SDE U/L model to weather information for the prospective time period (T+1) and the building occupancy parameter (P) to generate a value that is added to the baseload value ($EUI^{Baseload}$) to generate a forecasted EUI value ($EUI^{Forecasted}$). Exemplary methods of applying a linear SDE U/L to generate a forecasted EUI value ($EUI^{Forecasted}$) are discussed above.

FIGS. 8a, 8b and 8c depict steps performed by the energy modelling server 110 to generate and apply linear models of energy use. Those skilled in the art can appreciate that some of these steps may be performed by entities other than the energy modelling server 110. Similarly, those skilled in the art can appreciate that some steps may not be performed, that steps may be performed on a continuous basis and/or in a different order.

FIG. 8a depicts steps performed by the non-linear modelling module 232 to generate a linear SDE U/L model. At step 802, the non-linear modelling module 232 receives as input records from the records database 233 comprising the following: an EUI value for a structure at a time period, a baseload value $EUI^{Baseload}$ for the time period, corresponding weather information (T, H, W, R) for the time period, and optionally, a building occupancy parameter (P). At step 804, the non-linear modelling module 232 generates a non-linear SDE U/L model. Exemplary SDE U/L models are discussed above.

FIG. 8b depicts steps performed by the energy use normalization module 240 to generate a temperature normalized EUI value ($EUI^{T\text{-}Normalized}$). At step 806, the energy use normalization module 240 receives a record from the baseline energy use module 220, the record comprising the following: an EUI value for a structure at a time period, a baseload value $EUI^{Baseload}$ for the time period, corresponding weather information (T, H, W, R) for the time period, and optionally, a building occupancy parameter (P). In other embodiments, records comprising the same information may be retrieved from storage (e.g., stored in the records database 233 or a separate database).

At step 808, the energy use normalization module 240 applies a non-linear SDE U/L model to a set point temperature T, weather information H, W, R and building parameter P to generate a value that is added to the baseload value ($EUI^{Baseload}$) to generate a temperature normalized EUI value ($EUI^{T\text{-}Normalized}$). Exemplary methods of applying a non-linear SDE U/L model to generate a temperature normalized EUI value are discussed above.

FIG. 8c depicts steps performed by the energy use forecasting module 250 to generate a forecasted EUI value for a future time period (T+1) ($EUI^{Forecasted}$). At step 810, the energy use forecasting module 250 receives a record from the baseline energy use module 220, the record comprising the following: an EUI value for a structure at a time period, a baseload value ($EUI^{Baseload}$) for the time period, and optionally, a building occupancy parameter (P). In other embodiments, records comprising the same information may be retrieved from storage (e.g., stored in the records database 233 or a separate database).

At step 812, the energy use forecasting module 250 retrieves or receives weather information for a prospective time period (T+1). As discussed above, the energy use forecasting module 250 can use either historical or forecasted weather information for the prospective time period.

At step 814, the energy use forecasting module 250 applies a non-linear SDE U/L model to weather information for the prospective time period (T+1) and the building occupancy parameter (P) to generate a value that is added to the baseload value ($EUI^{Baseload}$) to generate a forecasted EUI value ($EUI^{Forecasted}$). Exemplary methods of applying a linear SDE U/L to generate a forecasted EUI value ($EUI^{Forecasted}$) are discussed above.

Example 1

To validate the utility and accuracy of the methods described above, test data (i.e. test raw energy use data and weather information) was collected from the various sources. FIG. 13a includes a table listing the various sources of test data. Raw energy use data for structures (i.e. energy consumption reading meter data) and data used to determine a building occupancy parameter (P) was received from the Utility Consumption Database (UCD), Ontario Ministry of Education, Canada. Weather information including air temperature (T), humidity (H), solar radiation (R) and wind speed (W) was collected from the website maintained by Wunderground. Solar radiation information was collected from the United States National Aeronautics and Space Administration.

FIG. 13b includes the parameter coefficient data calculated by generating the linear SDE U/L model described in the equations above using the test data. FIG. 9 includes the topology of the neural network algorithm used to generate the non-linear model. As discussed above, a multi-layer perceptron feed forward neural network with two hidden layers and five input nodes is used in conjunction with options for resilient gradient descent and back propagation to was used to generate a non-linear SDE U/L model.

Figure 14:
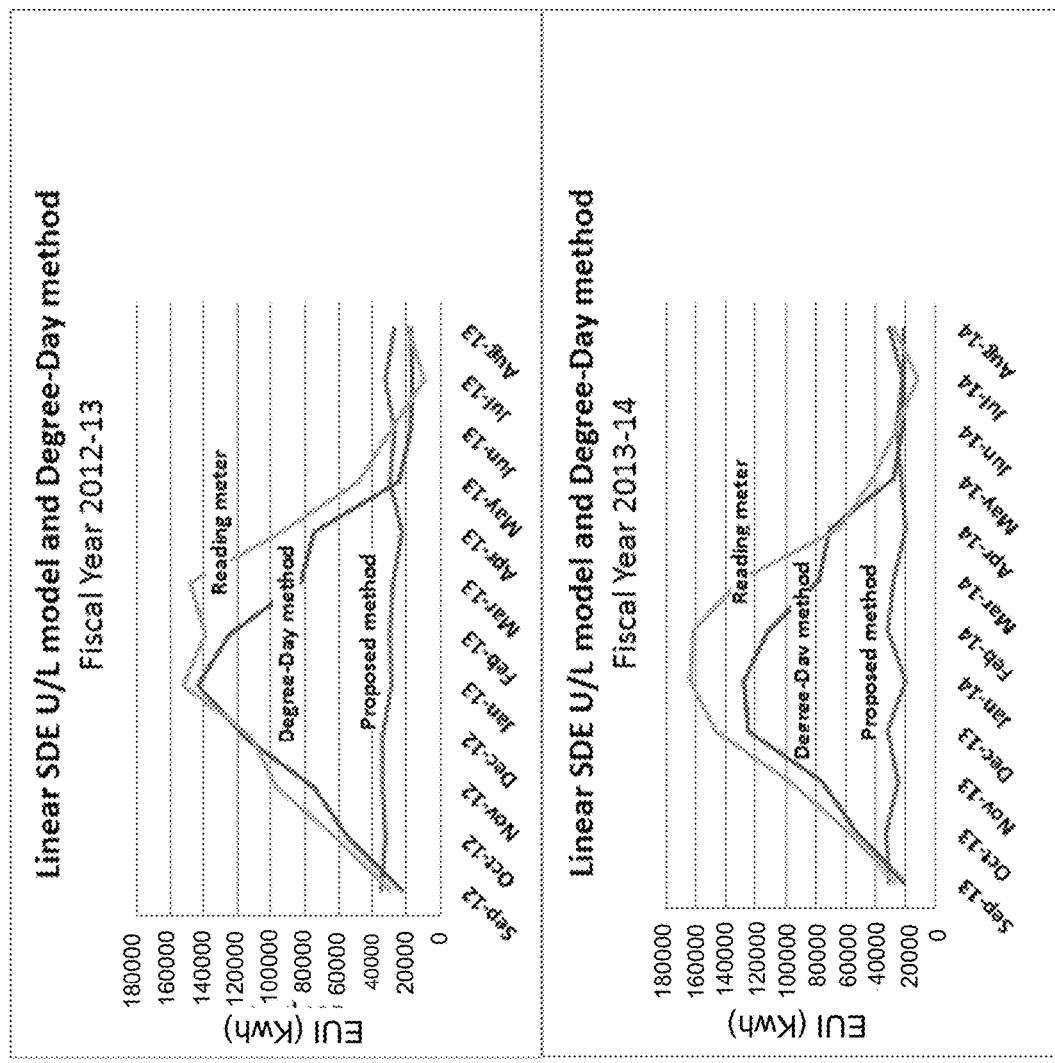
FIG. 14 is a graph of temperature normalized EUI values generated using a linear SDE U/L model alongside un-normalized EUI values and EUI values that were normalized according to a prior art "Degree Day" method.
Figure 15:
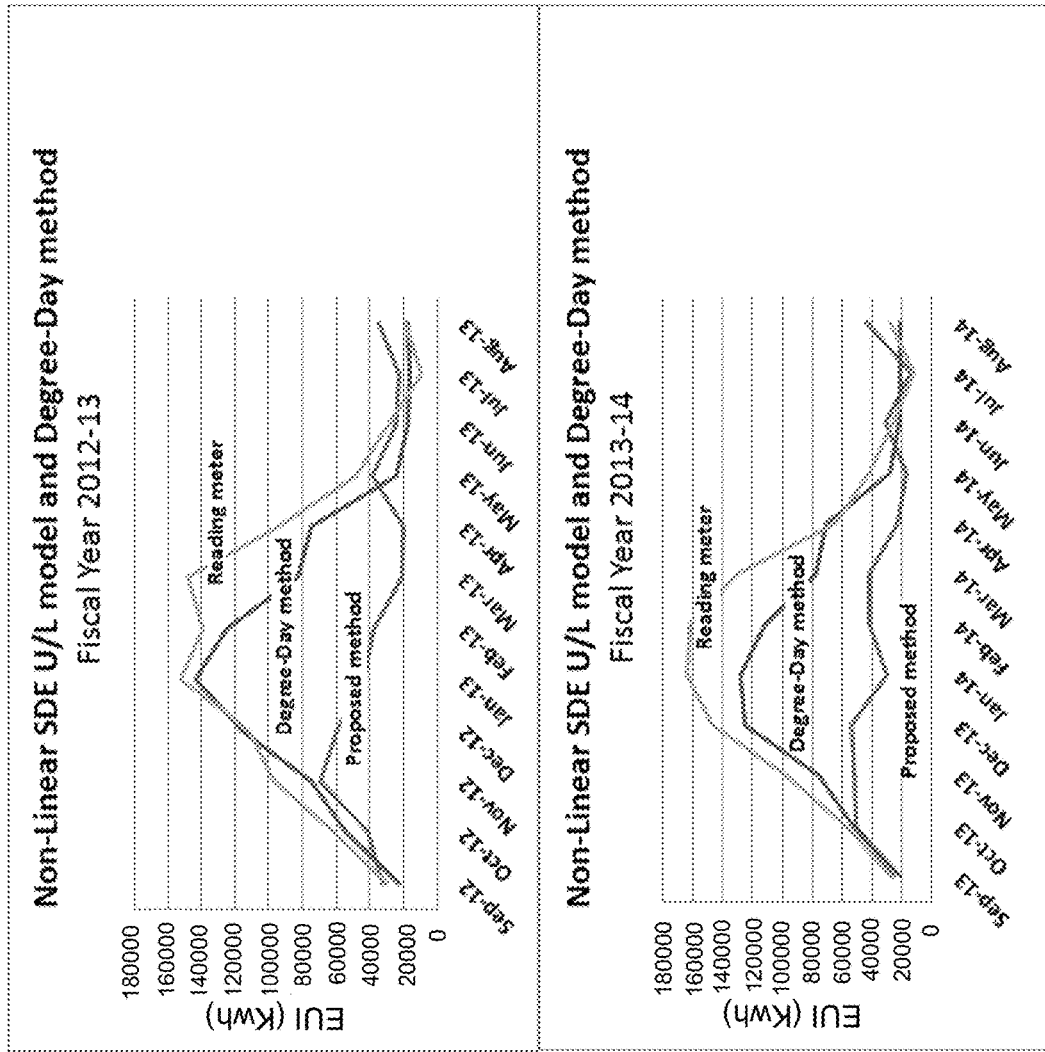
FIG. 15 is a graph of temperature normalized EUI values generated using a non-linear SDE U/L model alongside un-normalized EUI values and EUI values that were normalized according to a prior art "Degree Day" method.

FIGS. 14 and 15 are plots of temperature normalized EUI values ($EUI^{T\text{-}Normalized}$) for generated using the linear and non-linear SDE U/L models respectively. The EUI values are shown for monthly time periods. The temperature normalized EUI values (labelled "Proposed Method") are plotted over time alongside the un-normalized EUI values (labelled "Reading Meter") and EUI values that have been normalized according to prior art "Degree Day" methods. As can be seen, the temperature normalized EUI values generated using the SDE U/L models do not show the same amount of dependency (i.e., correlation) to the un-normalized values as the EUI values generated using the Degree Day, suggesting partial or complete elimination of temperature-related energy usage from the temperature normalized EUI values.

Figure 16A:
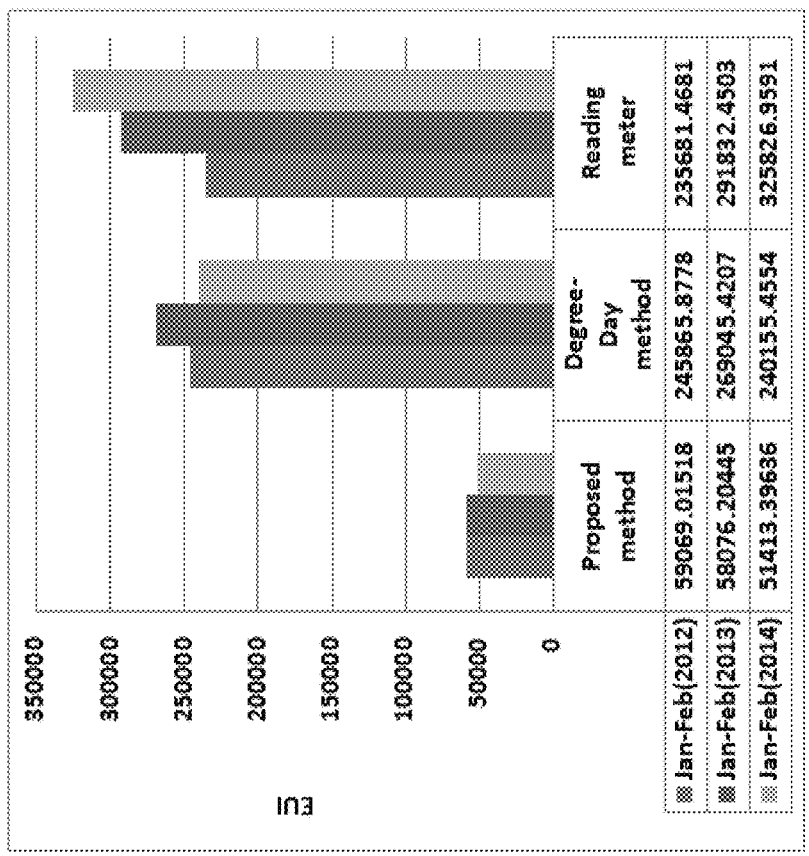
FIG. 16a is a bar chart of temperature normalized EUI values alongside un-normalized EUI values and EUI values that were normalized according to a prior art "Degree Day" method.
Figure 16B:
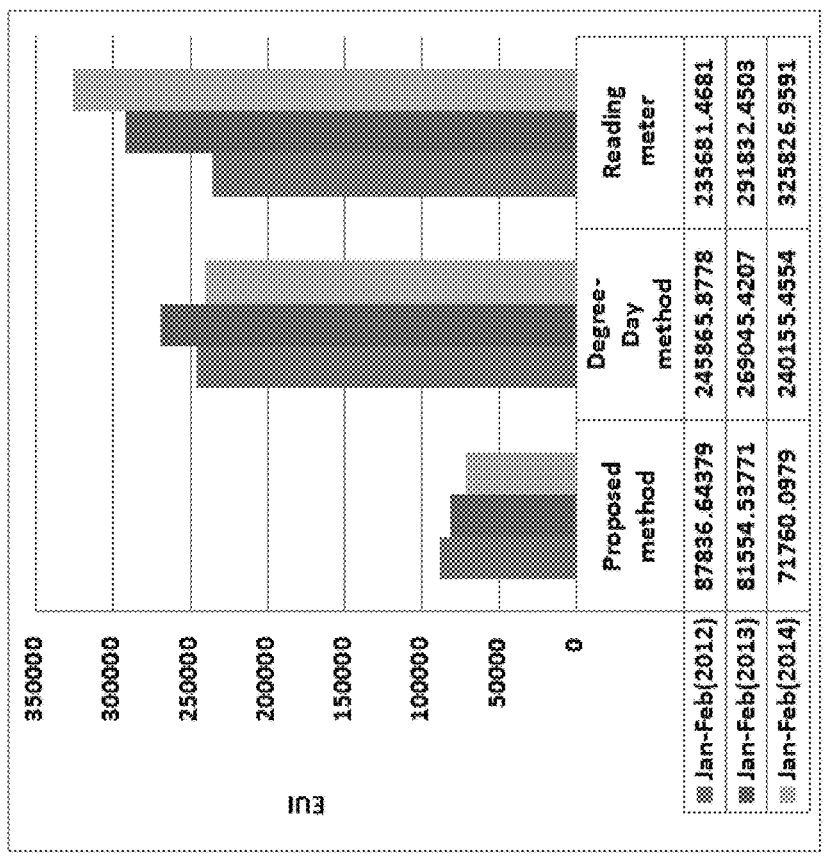
FIG. 16b is a bar chart of temperature normalized EUI values alongside un-normalized EUI values and EUI values that were normalized according to a prior art "Degree Day" method.

FIGS. 16a and 16b are bar charts of temperature normalized EUI values ($EUI^{T\text{-}Normalized}$) for generated using the linear and non-linear SDE U/L models respectively. The EUI values are shown for three fiscal-year time periods (i.e., 2012, 2013, 2014). The temperature normalized EUI values (labelled "Proposed Method") are shown over time alongside the un-normalized EUI values (labelled "Reading Meter") and EUI values that have been normalized according to prior art "Degree Day" methods. As can be seen, the temperature normalized EUI values generated using the SDE U/L models show a slight trend towards a reduction of energy usage, while the Degree Day methods does not show the same trend.

Figure 17:
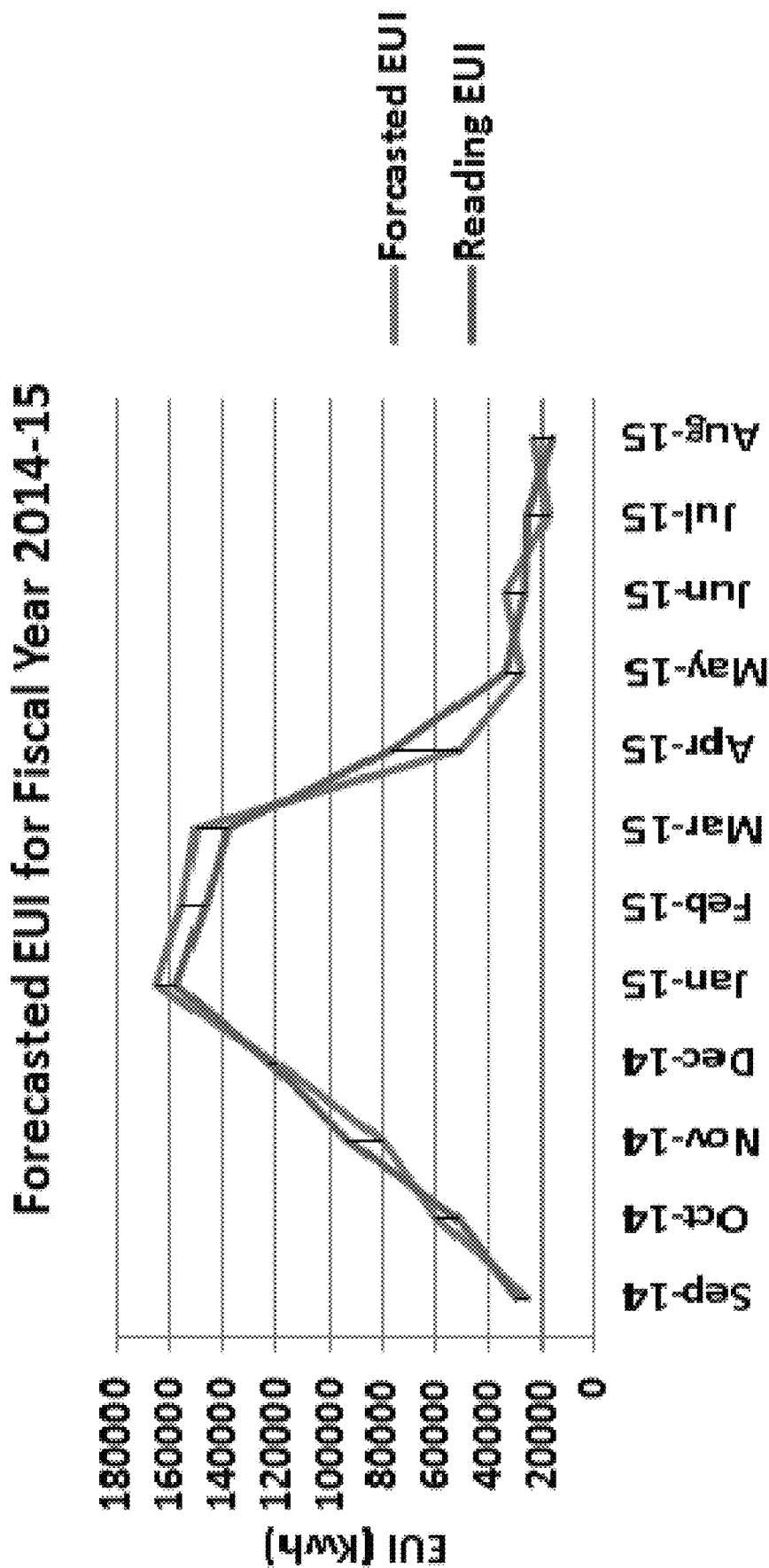
FIG. 17 is a plot of forecasted EUI values based on actual observed weather information for the time period and the observed EUI at the time periods.

FIG. 17 plots forecasted EUI values used to determine the accuracy of the non-linear SDE U/L model at predicting energy consumption. Specifically, the non-linear SDE U/L model was applied to known weather information for the 2014 and 2015 fiscal years to generate forecasted EUI values ($EUI^{Forecasted}$). As shown in the plots, the non-linear model was highly accurate and generated forecasted EUI values ($EUI^{Forecasted}$) that closely matched the observed EUI values with the same weather information.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The invention claimed is:

1. A computer-implemented method of generating a temperature-normalized energy use intensity (EUI-T) value for a structure, the method comprising:
   receiving, by a processor: raw energy use data by the structure; weather information for a geographic location containing the structure, the weather information comprising a plurality of weather parameters related to weather data; and building occupancy information of the structure, the building occupancy information comprising one or more occupancy parameters related to occupancy data;
   pre-processing, validating and remediating, by the processor, the raw energy use data;
   generating, by the processor, an energy use intensity (EUI) value representing energy use by the structure over a time period;
   generating, by the processor, a heating load of the structure, a cooling load of the structure and a baseload value of the structure, the baseload value comprising a passive baseload and an active baseload, the passive baseload determined from either a historic minimum energy use or from a combination of the heating load and the cooling load;
   generating, by the processor, an energy use intensity baseload (EUIbl) value corresponding to the baseload value over the time period;
   training, by the processor, a neural network on data related to the weather information and the building occupancy information to generate a non-linear Structure Dependent Energy Usage/Loss (SDE U/L) of the structure, with each of the weather parameters and each of the one or more occupancy parameters assigned to a node at an input layer of the neural network, the neural network comprising one or more hidden layers and the neural network using back propagation to generate the SDE U/L; and
   generating, by the processor, the temperature-normalized energy use intensity value at a set point temperature of the structure, based on the EUIbl and the SDE U/L at the set-point temperature of the structure.

2. The method of claim 1, wherein the weather information comprises one or more solar radiation values, one or more outside temperature values, one or more humidity values and one or more wind speed values.

3. The method of claim 1, further comprising: using the temperature normalized energy use intensity value of the structure to determine, by the processor, at least one of: a volume of greenhouse gas emissions by the structure and a cost of energy use of the structure.

4. The method of claim 1, wherein:
   the weather information comprises: a recorded temperature (T), a wind speed (W), a humidity (H), and a solar radiation (R);
   the building occupancy information comprises a building occupancy parameter (P); and
   each of the T, H, W, R and P is assigned to a node at the input layer of the neural network.

5. The method of claim 1, wherein:
   the neural network is a multi-layer perceptron feed forward neural network with two hidden layers and five input nodes;
   the data related to the weather information comprises: a recorded temperature (T), a wind speed (W), a humidity (H), and a solar radiation (R);
   the data related to the building occupancy information comprises a building occupancy parameter (P); and
   each of T, H, W, R and P is assigned to one of the five input nodes of a first layer of the neural network.

6. The method of claim 1, wherein the one or more occupancy parameters is at least one of: a number of occupants of the structure, time spent by the occupants in the structure and a difference between the set point temperature and an occupant-selected set point temperature.

7. The method of claim 1, wherein the neural network uses gradient descent back propagation, variable learning rate back propagation, conjugate gradient back propagation or quasi-Newton back propagation.

8. A system for generating a temperature-normalized energy use intensity (EUI-T) value of a structure, the system comprising:
   a processor; and
   a memory storing instructions that, when executed by the processor, configure the system to:
      receive, by the processor: raw energy use data by the structure; weather information for a geographic location containing the structure, the weather information comprising a plurality of weather parameters related to weather data; and building occupancy information of the structure, the building occupancy information comprising one or more occupancy parameters related to occupancy data;
      pre-process, validate and remediate, by the processor, the raw energy use data;
      generate, by the processor, an energy use intensity (EUI) value representing energy use by the structure over a time period;
      generate, by the processor, a heating load of the structure, a cooling load of the structure and a baseload value of the structure, the baseload value comprising a passive baseload and an active baseload, the passive baseload determined from either a historic minimum energy use or from a combination of the heating load and the cooling load;
      generate, by the processor, an energy use intensity baseload (EUIbl) value corresponding to the baseload value over the time period;
      train, by the processor, a neural network on data related to the weather information and the building occupancy information to generate a non-linear Structure Dependent Energy Usage/Loss (SDE U/L) of the structure, with each of the weather parameters and each of the one or more occupancy parameters assigned to a node at an input layer of the neural network, the neural network comprising one or more hidden layers and the neural network using back propagation to generate the SDE U/L; and
      generate, by the processor, the temperature-normalized energy use intensity value based on the EUIbl and the SDE U/L at a set-point temperature of the structure.

9. The system of claim 8, wherein the weather information comprises one or more solar radiation values, one or more outside temperature values, one or more humidity values and one or more wind speed values.

10. The system of claim 8, wherein the instructions further configure the system to:
use the temperature normalized energy use intensity value of the structure to determine, by the processor, at least one of: a volume of greenhouse gas emissions by the structure and a cost of energy use of the structure.

11. The system of claim 8, wherein:
the weather information comprises: a recorded temperature (T), a wind speed (W), a humidity (H), and a solar radiation (R);
the building occupancy information comprises a building occupancy parameter (P); and
each of the T, H, W, R and P is assigned to a node at the input layer of the neural network.

12. The system of claim 8, wherein:
the neural network is a multi-layer perceptron feed forward neural network with two hidden layers and five input nodes;
the data related to the weather information comprises: a recorded temperature (T), a wind speed (W), a humidity (H), and a solar radiation (R);
the data related to the building occupancy information comprises a building occupancy parameter (P); and
each of T, H, W, R and P is assigned to one of the five input nodes of a first layer of the neural network.

13. The system of claim 8, wherein the one or more occupancy parameters is at least one of: a number of occupants of the structure, time spent by the occupants in the structure and a difference between the set point temperature and an occupant-selected set point temperature.

14. The system of claim 8, wherein the neural network uses gradient descent back propagation, variable learning rate back propagation, conjugate gradient back propagation or quasi-Newton back propagation.

* * * * *